3,477,226
HEAT PUMP HEAT REJECTION SYSTEM FOR A CLOSED CYCLE HOT GAS ENGINE
Worth H. Percival, Grosse Pointe Woods, Mich., assignor to General Motors Corporation, Detroit, Mich., a corporation of Delaware
Filed Feb. 27, 1968, Ser. No. 708,716
Int. Cl. F03g 7/06
U.S. Cl. 60—24          5 Claims

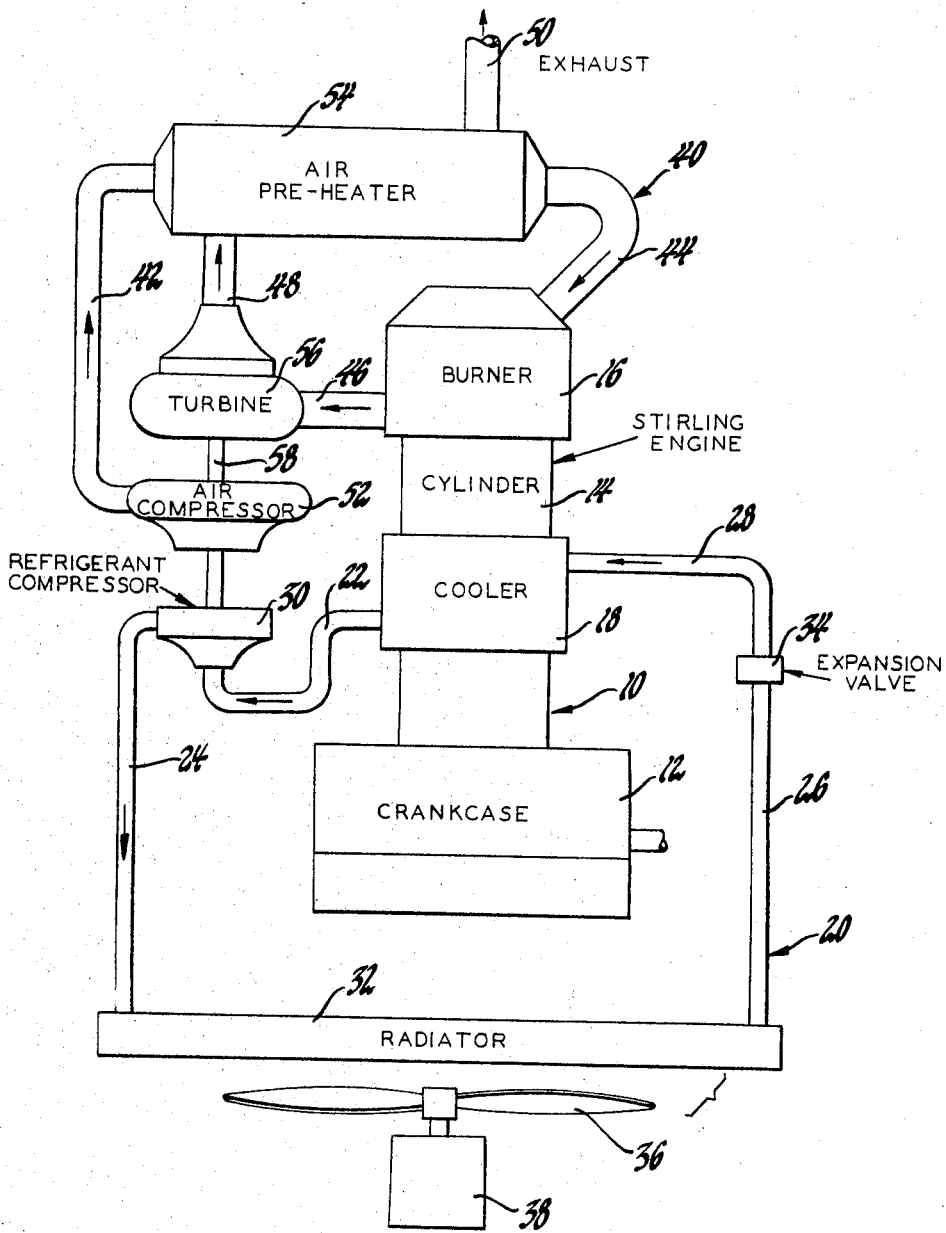

ABSTRACT OF THE DISCLOSURE

An external combustion hot gas engine cooling system requiring a substantially smaller radiator than conventional systems through use of a heat pump refrigerant system to increase the coolant temperature in the radiator. A gas turbine arrangement is utilized to drive the refrigerant compressor and a combustion air preheater is included to recover heat from the turbine exhaust gases. The turbine is driven by exhaust gas from the engine burner, which is pressurized by a supercharging compressor also driven by the turbine.

BACKGROUND OF THE INVENTION

This invention relates to closed cycle hot gas engines, such as Stirling engines, and more particularly to a form of cooling system for such engines in which a heat pump heat rejection system is utilized to reduce the size of heat exchanger required to handle the rejection of waste heat from the engine.

It is characteristic of a closed cycle engine, such as a Stirling engine, that it must reject about three to four times as much heat per horsepower hour to its cooling system as is necessary for a conventional internal combustion engine operating on the open cycle principle. In the open cycle engine, a large portion of the waste heat is rejected with the exhaust of the working gas from the cylinder at the end of each working cycle. In the Stirling engine, however, the working gas is retained within the engine and the waste heat must be rejected entirely by a separate cooling system.

A typical form of such an engine is shown and described in U.S. Patent No. 3,077,732 Reinhart et al. As is conventional, this engine utilizes a water cooled heat exchanger to reject waste heat from the engine working gas. In many current designs, the temperature of the water coolant must be kept relatively low in order to obtain satisfactory life of piston rings and seals used in the engine.

Stationary applications of such an engine, where an adequate supply of cooling water is available, permit the use of a simple water cooling system. It is, of course, also possible to use a closed coolant system, wherein the heat from the coolant is rejected to atmosphere through a conventional radiator. However, due to the amount of heat rejected to the cooling system, the size of the radiator required is much larger than that which would be required for an internal combustion engine of comparable size. In certain engine applications, such as where the engine is used to drive a vehicle, the space in which a cooling system must be located may provide limitations on radiator size which would render the installation of a conventionally cooled Stirling engine difficult or impossible.

SUMMARY OF THE INVENTION

The present invention provides a cooling system for a closed cycle engine, such as a Stirling engine, in which the size of radiator, or other heat exchanger, required is substantially reduced from that of conventional systems.

The arrangement utilizes a heat pump system which circulates a refrigerant such as Freon 11 or a similar chlorine-fluorine refrigerant compound. The refrigerant is vaporized in the engine cooler and is then compressed to a higher temperature and pressure for delivery to the radiator so that more efficient heat transfer in the radiator is obtained and a substantially smaller radiator may thus be used.

While the refrigerant compressor could be driven directly by the engine, this would require a substantial portion of the engine power and, accordingly, the invention provides separate motor means such as a turbine for driving the compressor. The turbine is driven by exhaust gases from the engine burner which is pressurized by means of an air compressor also driven by the turbine. A preheater is used to improve efficiency by transferring heat from the turbine exhaust to the combustion air delivered from the compressor to the engine burner.

These and other features and advantages of the invention will be more readily understood from the following description of a preferred embodiment of the invention.

BRIEF DESCRIPTION OF THE DRAWING

The single figure of the drawing illustrates a preferred embodiment of a heat rejection system according to the invention as connected to a closed cycle hot gas engine of the Stirling cycle type.

DESCRIPTION OF THE PREFERRED EMBODIMENT

In the drawing, numeral 10 generally indicates a Stirling engine which may, for example, be constructed similarly to that shown in U.S. Patent 3,077,732 Reinhart et al. The engine comprises a crankcase 12 retaining a cylinder 14 on which are mounted a burner or heater 16 and a cooler or heat exchanger 18.

The cooler is arranged in a conventional manner to reject waste heat from the working gas of the engine. The burner is likewise conventional in its function of supplying heat to the engine working gas for conversion into mechanical energy. The burner differs in construction from previously known devices in that it is constructed to receive combustion air under a substantial pressure for reasons to be subsequently indicated.

The engine cooler 18 is connected with a heat pump cooling system generally indicated by numeral 20. The heat pump system includes pressure lines 22, 24, 26 and 28 which interconnect the cooler with a refrigerant compressor 30, a radiator 32 and an expansion valve 34 or other suitable flow restriction. The system contains a suitable refrigerant, preferably one of the known chlorine-fluorine refrigerant compounds such as that having the chemical formula $CCl_3F$ and known commercially as Freon 11. A cooling fan 36, driven by a suitable motor 38 or directly by the engine, is arranged in a conventional manner to pass air through the radiator for removing heat therefrom.

The engine burner 16 is interconnected with a combustion air supply and supercharging system generally indicated by numeral 40. This system includes a group of conduits 42, 44, 46, 48 and 50 which connect together a rotary air compressor 52, and air preheater 54, the engine burner 16 and an exhaust driven turbine 56, the latter being connected through the air preheater and exhaust line 50 to atmosphere.

Turbine 56 is connected by means of a shaft 58 with both air compressor 52 and refrigerant compressor 30. such that both compressors are adapted to be driven by the turbine.

The operation of the above described system is as follows. Rotation of compressor 52 causes it to draw in fresh air from the atmosphere, compressing it and forcing it through conduit 42 to preheater 54 where its temperature is increased. The air then passes through conduit 44 to the burner jacket where it is mixed with fuel and burned to produce heat. A substantial portion of the heat produced in the burner is delivered directly to the engine working gas. Nevertheless, the combusion products leave the burner under pressure and at an elevated temperature and are directed through conduit 46 into turbine 56. In the turbine, the combustion products are expanded to a lower temperature and pressure, giving up energy to the turbine so that it may drive the air compressor 52 and refrigerant compressor 30. From turbine 56 the combustion products, still at a substantial temperature, pass through conduit 48 into preheater 54 where they give up a substantial portion of their remaining heat to the incoming combustion air. The combustion products are then directed to atmosphere through the exhaust conduit 50.

Meanwhile, in the heat pump system, the working gas passing through cooler 18 rejects heat to the liquid refrigerant therein causing it to vaporize. The vaporized refrigerant is drawn through line 22 into the rotating compressor 30 wherein it is compressed to a higher temperature and pressure and directed through line 24 to the radiator 32. Air driven through the radiator by fan 36 causes the rejection of heat from the coolant in the radiator to the atmosphere. This loss of heat causes the refrigerant to condense. The refrigerant then passes in liquid form through line 26 to an expansion valve 34 which acts as a restriction to flow and causes a reduction in the pressure of the refrigerant. The refrigerant then flows through line 28 into cooler 18 and the cycle is repeated.

The foregoing arrangement has the advantage that the temperature of the refrigerant is kept relatively low in the cooler so that heat is efficiently rejected from the engine to the refrigerant and then the temperature is substantially increased before the refrigerant is passed through the radiator so that a substantial temperature exists between the refrigerant and the ambient air. This permits the use of a substantially smaller radiator than would otherwise be required to provide adequate cooling. At the same time, the use of a separate turbine, driven by the pressurized exhaust from the burner of the engine, provides means for driving the refrigerant compressor separate from the engine so that its power is not diminished by the use of the heat rejection cooling system.

Such a system does, of course, add complexity and requires additional components with a possible loss in overall efficiency due to the power required to drive the compressor. These factors are offset to some extent by the decreased cost of the smaller radiator and a possible increase in engine efficiency due to better cooling. Nevertheless, it is expected that such a system would only be used in an installation where space is at a premium and a compact radiator is essential.

The table indicates typical temperature and pressure conditions which might exist at various points of such a cooling system.

TABLE

| Location | Temperature, °F. | Pressure, p.s.i. Absolute | Fluid State |
|---|---|---|---|
| Air Supply and Supercharging System: | | | |
| Air Compressor Inlet | 60 | 14.7 | |
| Air Compressor Outlet: Preheater Inlet | 427 | 73.5 | |
| Preheater Outlet: Burner Inlet | 1,013 | 72.8 | |
| Burner | 4,000+ | 72.8 | |
| Burner Outlet: Turbine Inlet | 1,700 | 72.0 | |
| Turbine Outlet: Preheater Inlet | 1,129 | 15.3 | |
| Preheater Exhaust | 609 | 14.7 | |
| Heat Pump Cooling System (Using Freon 11): | | | |
| Cooler Outlet: Refrigerant Compressor Inlet | 140 | 45.4 | Gas. |
| Refrigerant Compressor Outlet: Radiator Inlet | 235 | 130 | Gas. |
| Radiator Outlet: Pressure Reducer Inlet | 220 | 130 | Liquid. |
| Pressure Reducer Outlet: Cooler Inlet | 140 | 45.6 | Do. |

It is been calaculated that such a system would permit a reduction in radiator size to about one-half of what is required for a conventional cooling system having a coolant temperature of 140° F.

While the invention has been described by reference to a preferred embodiment chosen for purposes of illustration, it should be understood that numerous changes or modifications could be made in the application of the invention to various situations within the skill of the art and it is accordingly desired that the invention not be limited except as indicated by the language of the following claims.

What is claimed is:

1. Heat rejection system for a closed cycle hot gas engine having a burner to supply heat energy to the working gas and a cooler to withdraw waste heat from the working gas, said heat rejection system comprising heat pump means connected with said cooler to remove heat energy therefrom, supercharging means connected with said burner to supply pressurized combustion air thereto, and drive means connected with said burner to receive therefrom pressurized gas exhausted from the burner to operate said drive means, said heat pump means and said supercharging means being connected with said drive means for operation thereby.

2. Heat rejection system for a closed cycle hot gas engine having a burner to supply heat energy to the working gas and a cooler to withdraw waste heat from the working gas, said heat rejection system comprising heat pump means including a refrigerant compressor connected with said cooler to carry heat energy therefrom, supercharging means including an air compressor connected with said burner to supply pressurized combustion air thereto, and compressor drive means including an expansion motor connected with said burner to receive therefrom pressurized gas exhausted from the burner to operate said motor, said refrigerant compressor and said air compressor being drivably connected with said motor for operation thereby.

3. The combination of claim 2 and further comprising an air preheater connected intermediate said air compressor and said burner, said preheater being also connected with said expansion motor to receive gas exhausted therefrom, said preheater being adapted to pass said pressurized combustion air in heat exchange relation with the exhaust gas from said motor to transfer heat from said exhaust gas to said combustion air.

4. The combination of claim 3 wherein said expansion motor comprises a gas driven turbine.

5. The combination of claim 4 wherein said heat pump means further includes a refrigerant to air heat exchanger to reject heat from the heat pump system to atmosphere.

References Cited

UNITED STATES PATENTS 2,664,698    1/1954    Van De Poll et al. _____ 60—24
3,399,526    9/1968    Meijer _____ 60—24

CARROLL B. DORITY, Jr., Primary Examiner